April 3, 1934. A. GITZHOVEN 1,953,556
SHUTTER FOR PHOTOGRAPHIC APPARATUS
Filed July 26, 1933 3 Sheets-Sheet 2
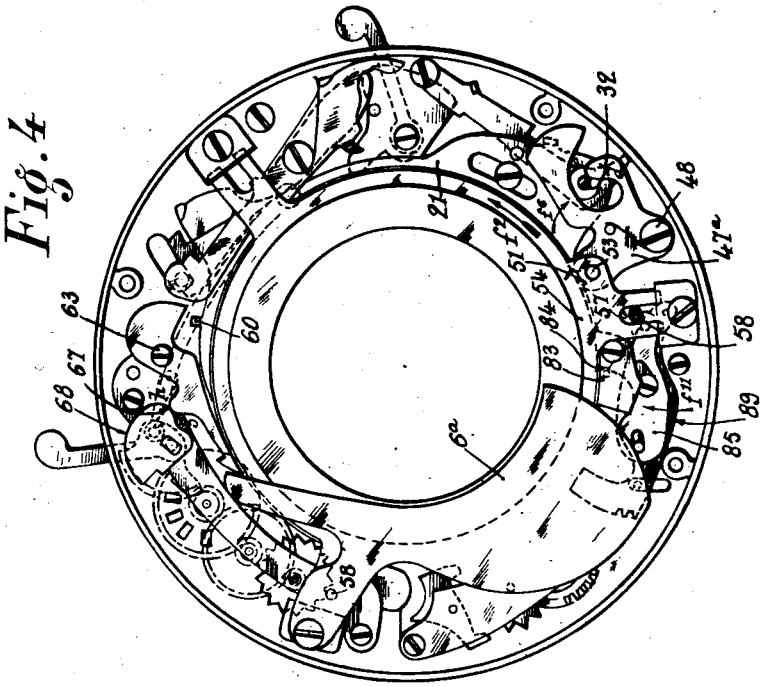
A. Gitzhoven
INVENTOR
By: Marks & Clerk
Attys.

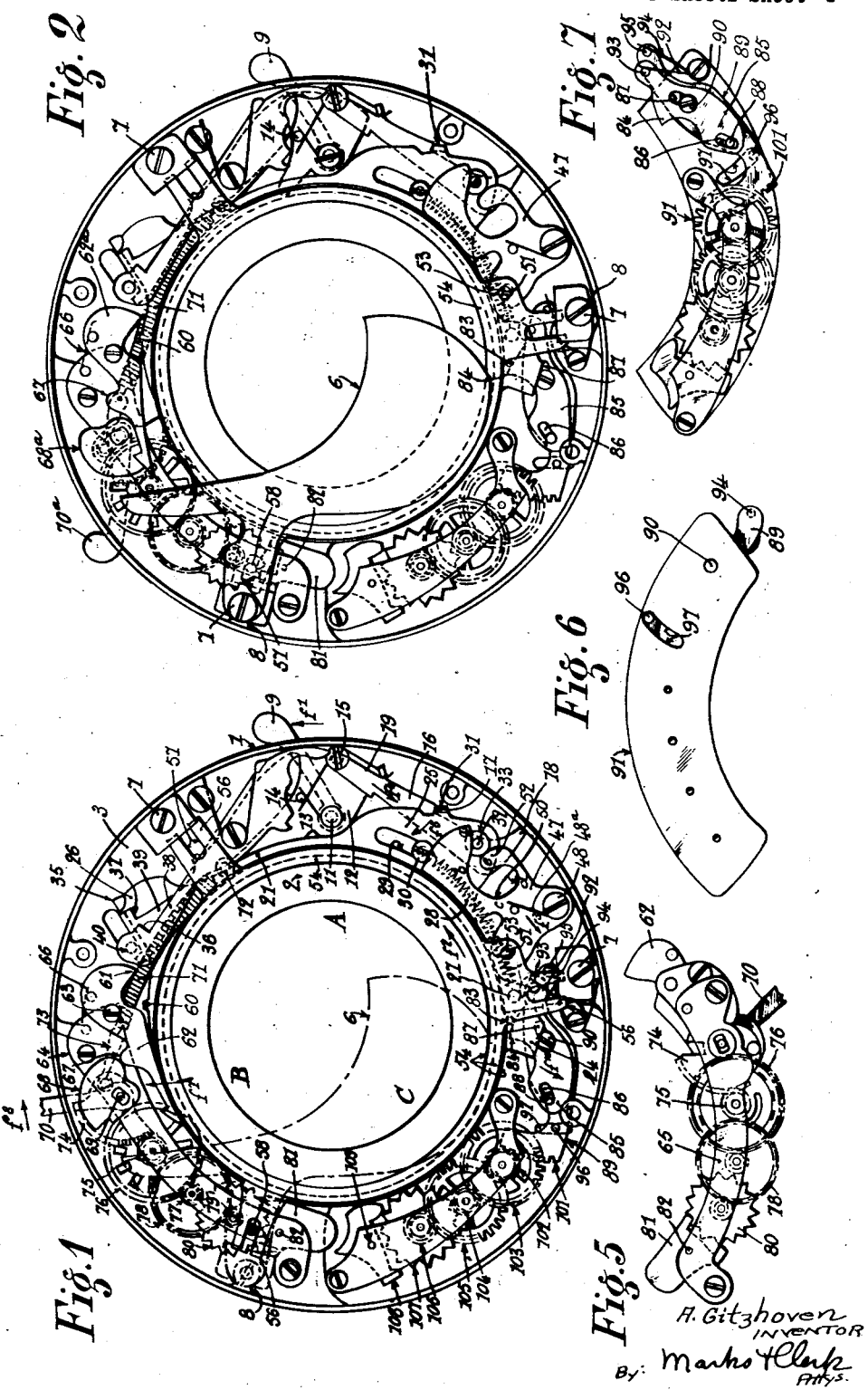

April 3, 1934.  A. GITZHOVEN  1,953,556
SHUTTER FOR PHOTOGRAPHIC APPARATUS
Filed July 26, 1933    3 Sheets-Sheet 3

A. Gitzhoven
INVENTOR

By Marks & Clark
Attys.

Patented Apr. 3, 1934

1,953,556

UNITED STATES PATENT OFFICE 1,953,556

SHUTTER FOR PHOTOGRAPHIC APPARATUS

Arsene Gitzhoven, Paris, France, assignor to "Gitzo" Société Anonyme, Paris, France Application July 26, 1933, Serial No. 682,342
In France August 4, 1932

5 Claims. (Cl. 95—63)

The present invention has for its object a shutter for photographic apparatus, of the sector type, of a very simple construction although operating in a perfect manner which permits an instantaneous exposure or a time exposure in one or two periods. It comprises in combination:

A first ring concentric with the axis of the shutter, pivoting about this axis, and subjected, in one direction, to the action of the usual operating lever through the medium of a release device, and in the other direction, to the action of a return spring.

A second ring, pivoting about its axis, which is superposed upon or concentric with the first, and is provided with forks, or like devices, by which it acts upon the sectors of the shutter, and A device for momentary connection between the two rings aforesaid, during a part of the return stroke of the first ring.

The present invention has also for its object the combinations of the above-mentioned shutter with a time-delay mechanism, and with a mechanism permitting to vary the duration of the taking of the views, and these independent devices may operate together or separately.

In conformity with the invention, the ring of the shutter, which is subjected to the action of the usual operating lever, comprises a stud, combined with a catch pertaining to the time-delay mechanism, so that when the mechanism for the closing and the mechanism for the time-delay have been set for operation, the stud and hence the ring are retained in the set position which precedes the opening of the shutter, as long as the time-delay mechanism has not returned to its idle position in which the said catch disappears.

According to another feature of the invention, the said ring carries a second stud combined with a catch which is adapted to disappear, at a given speed, from the mechanism which regulates the duration of opening of the shutter, the stroke of the catch, which is necessary for its disappearing, being adjustable, so that when the closing mechanism has been set for action, the stud and hence the ring are braked during their return stroke, during which the opening of the shutter takes place, and the duration of the braking depends upon the adjustable disappearing stroke of the catch.

In the accompanying drawings, which are given solely by way of example:

Fig. 1 is a front view, on a large scale, of the whole of the mechanisms in the idle position, the mechanism for regulating the duration of the shutter being in a position corresponding to any given duration of the opening of the shutter.

Fig. 2 is an analogous view, after the setting of the time-delay mechanism.

Fig. 3 is an analogous view, after the setting of the closing mechanism itself.

Fig. 4 is an analogous view, after the release of the ring by the time-delay mechanism, the shutter being open.

Figs. 5 and 6 represent the faces, which are not visible in Fig. 1, of the mechanisms for the time delay and for the duration of opening of the shutter.

Fig. 7 represents the mechanism for regulating the duration of opening of the shutter, on the side visible in Figs. 1 to 4.

Figure 9:
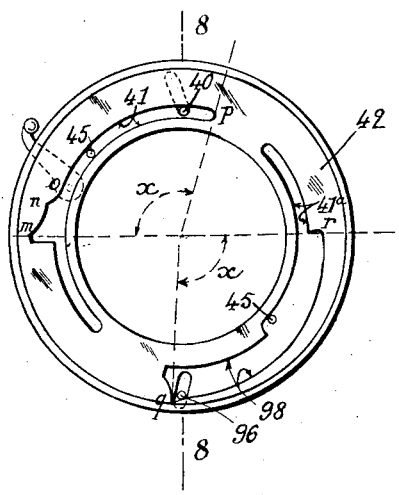
Fig. 9 is a view of the front face of the ring which permits to act upon the duration of opening of the shutter.

In the form of construction herein represented, the shutter comprises a metallic casing, preferably consisting of a single piece, and including two parts 1 and 2 formed by revolution about the axis X—X of the shutter (Fig. 8) and connected together by a flat cheek 3.

The axial inner space 4 (Fig. 8) may contain the lens and the diaphragm, of the iris or other type.

As concerns the annular chamber 5 (Fig. 8) provided between the two parts 1 and 2, it receives (Fig. 1):

The mechanism A adapted to control a certain number of shutter sectors, such as the sector 6, which is alone represented (Figs. 1 to 4) which sectors 6 are pivoted upon axles 7 mounted upon bosses 8 (Figs. 1 and 2) formed with the casing or separately secured thereto;

The mechanism B which is adapted to delay, at will, the opening of the shutter.

The mechanism C, which is adapted to regulate the duration of the opening of the shutter when taking instantaneous views.

The mechanism A, adapted to control the sectors 6 comprises an operating lever 9 (Fig. 1) projecting from the casing, and upon which one may act either directly or by means of a push-piece (not shown). This lever 9 is keyed to an axle 11, to which is also secured a plate 12 which participates, in consequence, in the oscillations of the lever 9. A spring 13, wound around the axle 11 and bearing at one end upon the part 2 of the casing and at its other end against a stud 14 mounted on the plate 12, tends to pivot the lever 9 and the plate 12 in the direction of the arrow $f^1$ (Fig. 1) about the axle 11.

To the plate 12 is pivoted, on an axle 15, a member 16 having the form of an L. Upon its rod, the said member 16 carries, on the side next the periphery of the casing, a shoulder or stop 17. The end 18 of the member 16 is in constant contact with the lower face of the peripheral part 1 of the casing, due to the action of a spring 19 surrounding the axle 15.

Figure 8:
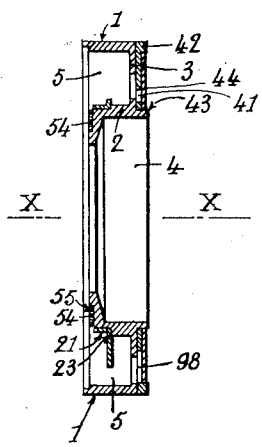
Fig. 8 is a diametrical section, in full size, of the casing, this section being taken on the line 8—8 of Fig. 9.
Figure 11:
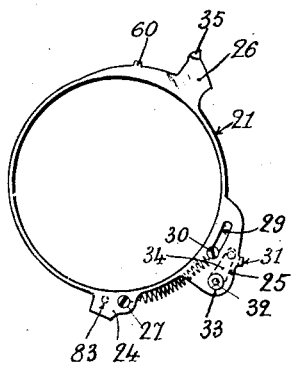
Fig. 11 is a view of the ring of the closing device, comprising the studs co-operating with the different devices above mentioned.

Immediately above the said member 16 is located a first ring 21, having a general cross-section in the form of an L. This ring, which is represented alone in Fig. 11, is mounted loose around the central part 2 of the casing and rests upon a shoulder 23 of this central part (Fig. 8). The said ring 21 comprises three lugs 24, 25 and 26, which are parallel with the faces of the casing.

To the lug 24 is attached, at 27, a spring 28 which tends to rotate the ring 21 in the direction of the arrow $f^2$ (Figs. 1, 3 and 4). The lug 25 is pierced with a curved aperture 29 whose centre is located on the axis X—X and in which is situated a stud 30, mounted on the casing. The said stud 30 limits the possible oscillations of the ring 21 about the axis X—X, to the length of the aperture 29.

The lug 25 further carries, on its lower face (with reference to the figures) a stud 31 so situated as to make contact with the stop 17 of the member 16, but to be released from said member after a given rotation in the direction contrary to the arrow $f^2$, as will be further set forth.

Upon its upper face (with reference to the figures) the lug 25 also carries a stud 32 which is slidable in a small socket 33 (Figs. 1 and 11) mounted on the lug 25. This stud 32 is urged upwardly by a small spring strip 34 secured to the lower face of the ring 21 (Fig. 11). The upper end of the stud 32 is cut on a bevel, and this bevel descends towards the lug 24.

As concerns the third lug 26, this carries a stud 35 adapted to co-operate with two stops 36 and 37 (Fig. 1) located on the ends of two usual levers 38 and 39 which permit, by their positions, either a time exposure in one or two periods, or an instantaneous exposure, according as their stops 36 or 37 are, or are not, located on the path of the stud 35 mounted on the ring 21, when the said ring is displaced in the direction of the arrow $f^2$.

Figure 10:
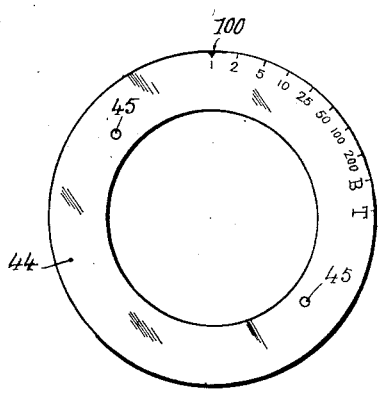
Fig. 10 is a view of the front face of the shutter.

The lever 38 carries, in the known manner, a rod 40, engaged in a groove 41 (Fig. 9) of an operating ring 42 (Figs. 8, 9 and 10). The said ring 42 is mounted loose on a shoulder 43 of the casing, upon which it is held by a plate 44 (Figs. 8 and 10) secured to the cheek 3 by means of a screw 45 extending through circular apertures 41 and 41ª whose centre is located on the axis X—X and which are formed in the ring 42. The external outline $m\ n\ o\ p$ of the groove 41 is made such that it will radially displace the stud 40 at $m\ n$ and at $n\ o$; the part $o\ p$ is circular, and its centre is located on the axis X—X.

Above the ring 21 is mounted a member 47 (Fig. 1) which is pivoted on an axle 48. Under the action of a spring 48ª, the member 47 is brought back in the direction of the arrow $f^3$, and it makes contact with the central part 2 of the casing. In the said member 47 are formed two notches 50 and 51. The first notch 50, whose outline is $a\ b\ c\ d\ e$, forms a projection 52 which is so situated that it may be encountered by the elastic stud 32 of the ring 21.

As concerns the notch 51, it receives a stud 53 (Fig. 1) mounted on the lower face (with reference to the figures) of a second ring 54.

The said ring 54 is centered with reference to the axis X—X; it is loose on a bearing portion 55 (Fig. 8) of the central part 2 of the casing. This ring 54 carries as many lugs 56 as there are sectors 6 provided in the shutter. Each of these lugs 56 comprises a notch 57 in which is engaged a stud 58 (Fig. 2) mounted on the corresponding sector 6.

The operation of the mechanism A is as follows. In the idle position (Figs. 1 and 2), the members are in the position shown in Fig. 1. The ring 21 is brought back by the spring 28, and the member 47 bears, under the action of the spring 48ª, against the central part 2 of the casing. This position is such that the notch 51 gives, due to the stud 53, to the upper ring 54 a position such that under the action of the notches 57 of said ring and of the studs 58, the sectors 6 will be brought upon the central part of the shutter, as represented in Figs. 1 and 2.

When one acts upon the lever 9, in the direction contrary to the one indicated by the arrow $f^1$, the plate 12 moves the member 16 in the direction of the arrow $f^4$ (Fig. 1). The stop 17 of said member 16 being in contact with the lower stud 31, mounted on the ring 21, this ring is moved in the direction contrary to the arrow $f^2$ (Fig. 3). But during this movement, the end 18 of the member 16 (which rubs under the action of the spring 19 against the periphery 1 of the case) causes the member 16 to oscillate about this end 18, in the direction of the arrow $f^5$ (Fig. 1). Thus when the ring 21 reaches the position 21ª represented in Fig. 3, the stud 31, which is mounted on the ring 21 and is obliged for this reason to describe an arc of a circle whose centre is located on the axis X—X, will escape abruptly from the stop 17.

At this time, the ring 21 is in a position 21ª such that the spring stud 32 is now situated in the notch 50 of the pivoting member 46, in the rear of the projection 52.

When the stud 31 has escaped from the stop 17 of the member 16, the ring 21 will turn, under the effect of the reaction spring 28, in the direction of the arrow $f^2$ (Figs. 3 and 4) in order to return, either to the idle position of Fig. 1 if the stops 36 and 37 of the levers 38 and 39 are out of the way (the case for instantaneous views and the case herein represented), or to an intermediate position, if one of these stops comes before the stud 35 of the ring 21 (the case for time exposures).

During the rapid return movement of the ring 21, the piston stud 32, which has been able to clear the projection 52 in the other direction, owing to its ramp, strikes, on the contrary, against this projection and obliges the member 47 to pivot in the direction of the arrow $f^6$ (Fig. 4) about its axis 48, this member coming to 47ª (Fig. 4). During this pivoting, the stud 32 moves along the edge $d\ e$ of the projection 52. When the stud 32 arrives at $e$ (Fig. 4), the member 47 has entirely pivoted to 47ª. It has thus moved, by means of the notch 51, the stud 53 of the ring 54, and this latter, due to the notches 57 and the studs 58, has pivoted the sectors 6 into the position 6ª (Fig. 4), thus causing the opening of the shutter.

In the case of time exposures, the ring 21 is stopped by the encounter of its stud 35 with one of the stops 36 or 37. The whole remains in the state of Fig. 4, up to the time in which, by another operation of the lever 9 which, under the action of the spring 13 (Fig. 1), has returned meanwhile to its idle position, as well as the member 16, one causes, by the stud 14, the disappearing of the levers 38 and 39, thus releasing the ring 21 and allowing it to finish its return stroke, whilst the member 47, now released from the stud 32, pivots in the direction of the arrow $f^3$ and brings the sectors into the closing position 6.

According to the present invention, the mechanism A above described may be combined with mechanism B for delaying and C for regulating the duration of the opening of the shutter.

In view of its connection with the delaying mechanism B, the ring 21 carries, to the left of the lug 26, a stud 60 (Figs. 1 and 11), in relief. This stud is adapted to co-operate with the point 61 of a catch 62. The said catch 62 is mounted so as to pivot at 63 on the end of two plates 64 (Fig. 1) and 65 (Fig. 5) which are connected together by cross-pieces. The catch 62 tends to pivot in the direction of the arrow $f^7$ (Fig. 1) under the action of a spring 66 which applies a boss 67 of said catch against the lateral surface of a cam 68. Said cam 68 is keyed to a shaft 69 carrying an operating lever 70. A spring 71, secured to the casing at 72 and to the lever 70 by a hook 73, tends to turn the lever 70 and the cam 68 in the direction of the arrow $f^8$. To the shaft 69 is keyed a toothed sector 74 which, by means of transmission gear 75—76—77—78—79 (Figs. 1 and 5) drives a ratchet wheel 80, combined with an anchor 81, pivoted at 82.

The combined operation of the mechanisms A and B is as follows. The whole device being supposed to be in the idle position (Fig. 1), the lever 70 is turned in the contrary direction to the arrow $f^8$ (Fig. 1), thus bringing it into the position 70ª of Fig. 2. The cam 68 takes the position 68ª, and the catch 62 the position 62ª, under the action of the spring 66. The spring 71 is set for action. One then sets the mechanism A, as above indicated, by acting on the lever 9 in the contrary direction to the arrow $f^1$. The ring 21 turns in the contrary direction to the arrow $f^2$, and its stud 60 comes to 60ª (Fig. 3) in the rear of the pointed end of the catch 62, which has the position 62ª, and this holds the mechanism A in the position of Fig. 3, even though the stop 17 of the member 16 has left the stud 31 of the ring 21 (which is at 21ª) and though this member 16 has returned to the idle position, as well as the plate 12 and the lever 9, under the action of the spring 13.

However, the spring 71 (Figs. 1 and 2) which had been set for action, tends to pivot the whole device consisting of the lever 70, the cam 68 and the toothed sector 74, in the direction of the arrow $f^8$. The rotation is impeded by the anchor escapement 80—81. During the rotation, the cam 68 passes before the boss 67 of the lever 62, and when the part $g\ h$ of the cam 68 makes contact with the boss 67 of the catch 62, this catch must turn about the axle 63 in the direction of the arrow $f^9$ (Fig. 3), against the effect of the reaction spring 66 (Fig. 1), in such way that its end 61 releases the stud 60 of the ring 21 (Fig. 4). This latter, when free, makes its return stroke, thus effecting the opening of the shutter, as above set forth.

Obviously, the mechanism B and its escapement are so arranged that between the instant of the end of the setting of the mechanism A and the instant of the release of this mechanism, there will be allowed the lapse of time which is desired, permitting, for instance, the photographer to take his place before the lens, in the subject to be photographed.

In view of the combination of the mechanism A with the mechanism C adapted to regulate the time of opening of the shutter when taking views termed "instantaneous", the ring 21 comprises, (see chiefly Fig. 11), projecting below the lower face of its lug 24, a stud 83. This stud 83 co-operates with the pointed end 84 of a catch 85 (Figs. 1, 6 and 7). In the said catch are two apertures 86 and 87 which are respectively traversed by a stud 88 mounted on a lever 89, and by the pivot axle 90 of the said lever, said axle 90 being mounted on a plate 91. Due to these slots, the catch 85 is enabled to slide in the direction of said slots, upon the lever 89, while participating in the oscillations of said lever about its axle 90. A spring 92, acting upon a stud 93 of the catch 85, tends to bring it towards the stud 83 of the ring 21. Another spring 94 bears upon a stud 95 of the lever 89 and tends to pivot it in the direction of the arrow $f^{10}$ (Figs. 1 and 7). The lever 89 carries, on its lower face, a stud 96 of some length. This stud 96 traverses the plate 91 in which is formed an aperture 97. The stud 96 extends (Fig. 9) into an aperture 98 in the ring 92. The edge $q\ r$ of this aperture 98 is eccentric, and thus the rotation of the ring 42 causes the radial displacement of the stud 96, and hence the pivoting of the lever 89 in one direction or the other. The ramp 98 has a radial development $x$ which is practically equal to that of the ramp $m\ n\ p$.

The different positions of the studs 40 and 96 are shown by a graduated scale on the plate 44, before which is movable a pointer 100, mounted on the edge of the ring 42. When the pointer 100 moves from the starting point of the scale as far as the figure 200, for instance, the stud 40 moves in the circular part $p\ n$ of the slot 41, and the mechanism A operates for instantaneous views, the duration of the opening being determined by the ramp $q,\ r$, as will be further set forth. When the pointer comes opposite the letter B, the stud 40 is at $n$, and the shutter operates for time exposures for a single period, due to the movement of the levers 38 and 39. When the pointer is opposite the letter T, the stud 40 is at $m$, and the shutter gives the time exposure in two periods.

The lever 89 carries at its end, beyond the stud 96, a toothed sector 101. This sector 101 engages a pinion 102. This pinion 102 is connected by the transmission gear 103—104—105—106 to a ratchet wheel 107, combined with an anchor 108 pivoting about an axle 109.

The operation of the combined mechanisms A and C is as follows. Before the engagement of the mechanism A, one gives to the lever 89 a determined position, by moving the pointer 100 before the graduated scale. The pointed end 84 of the catch 85 is now situated to the left of the stud 83 of the ring 21, and the end of the point 84 projects, in the radial centripetal direction, with reference to the stud 83, by an amount which depends upon the angular position of the lever 89. When the mechanism A is set for action, the ring 21 moves in the direction of the arrow $f^2$, and its stud 83 bears, from right to left, upon the catch 85. This catch disappears for the time, due to the slots 86 and 87, and then resumes its place, under the action of the spring 92. The pointed end 84 and the stud 83 now have the relative positions shown in Fig. 3.

When the release of the ring 21 takes place, either when the stop 17 of the member 16 leaves the stud 31 of the ring 21 (if the time delay mechanism B has not been used), or when the end 61 of the catch 62 of this mechanism B leaves the stud 60 of the ring 21 (if the mechanism B has been used), the stud 83 of said ring meets the left-hand edge of the end 84 of the catch, at the exact time when the spring-stud 32 obliges the member 47 to turn about, thus causing the opening of the shutter. The ring 21 is hence slowed down when returning to the idle position, as it is obliged to turn the catch 83 and the lever 89 to which it is secured, in the direction of the arrow $f^{11}$ (Fig. 4) by an amount equal to the amount by which the end 84 projected outwardly in the radial and the centripetal direction, with reference to the stud 83 (compare the positions in Figs. 3 and 4). However, the rotation of the lever 89 is in connection with that of the anchor escapement mechanism 107—108. It is thus observed that the closing of the shutter can only take place at the end of a determined time, which can be regulated by the angular position given to the lever 89. This duration is longer according as the ramp $q\ r$ acts on the stud 96 at a point nearer the end $q$.

As observed, the mechanisms A, B and C may operate in conjunction or separately. The shutter may thus, at will, comprise the mechanism A alone, or this mechanism and one of the mechanisms B or C, or the three mechanisms A, B and C.

Obviously, the invention is not limited to the form of construction herein represented, which is given only by way of example.

Having now described my invention what I claim as new and desire to secure by Letters Patent is:

1. In a shutter for photographic apparatus, in combination a casing provided with a central opening, a number of sectors pivotally mounted at the periphery of said casing and adapted to cover and uncover said opening, a first ring rotatably mounted on said casing and pivotally connected with said sectors, a second ring rotatably mounted on said casing, an operating lever, a releasing device mounted between said lever and said second ring and adapted to hold said lever and said second ring in engagement during a portion of the stroke of said lever in one direction and to release said ring during the other portion of said stroke in said direction and during the return stroke of said lever in the opposite direction, spring means adapted to urge said second ring in the opposite direction to that imparted to said second ring by said operating lever, and connecting means between said first and second rings adapted to become operative only during a portion of the movement of said second ring under the action of said spring means.

2. In a shutter for photographic apparatus, in combination a casing provided with a central opening, a number of sectors pivotally mounted at the periphery of said casing and adapted to cover and uncover said opening, a first ring rotatably mounted on said casing and pivotally connected with said sectors, a second ring rotatably mounted on said casing, an operating lever, a link pivotally connected at one end with said lever and provided with a shoulder, elastic means urging the other end of said link against the outer wall of said casing, a stud on said second ring adapted to engage said shoulder on said link during a portion of the stroke of said lever in one direction and to be out of engagement with said shoulder during the other portion of said stroke in said direction and during the return stroke of said lever in the opposite direction, spring means adapted to urge said second ring in the opposite direction to that imparted to said second ring by said stud and said shoulder of said link, and connecting means between said first and second rings adapted to become operative only during a portion of the movement of said second ring under the action of said spring means.

3. In a shutter for photographic apparatus, in combination a casing provided with a central opening, a number of sectors pivotally mounted at the periphery of said casing and adapted to cover and uncover said opening, a first ring rotatably mounted on said casing and pivotally connected with said sectors, a second ring rotatably mounted on said casing, an operating lever, a releasing device mounted between said lever and said second ring and adapted to hold said lever and said second ring in engagement during a portion of the stroke of said lever in one direction and to release said ring during the other portion of said stroke in said direction and during the return stroke of said lever in the opposite direction, spring means adapted to urge said second ring in the opposite direction to that imparted to said second ring by said operating lever, a pivoting member provided with a projecting part, a pivoted connection between said first ring and said pivoting member, a stud yieldingly mounted on said second ring and adapted to yield under said projecting part when said second ring is moved by said lever and to engage said projecting part when said second ring is moved by said spring means.

4. In a shutter for photographic apparatus, in combination a casing provided with a central opening, a number of sectors pivotally mounted at the periphery of said casing and adapted to cover and uncover said opening, a first ring rotatably mounted on said casing and pivotally connected with said sectors, a second ring rotatably mounted on said casing, an operating lever, a releasing device mounted between said lever and said second ring and adapted to hold said lever and said second ring in engagement during a portion of the stroke of said lever in one direction and to release said ring during the other portion of said stroke in said direction and during the return stroke of said lever in the opposite direction, spring means adapted to urge said second ring in the opposite direction to that imparted to said second ring by said operating lever, connecting means between said first and second rings adapted to become operative only during a portion of the movement of said second ring under the action of said spring means, a toothed member rotatably mounted in said casing, a spring adapted to rotate said toothed member in one direction, a time-delay mechanism adapted to cooperate with said toothed member, a cam operatively connected with said toothed member, a stud carried on said second ring, and a catch disposed in the path of said stud when said second ring has been displaced by said operating lever, said catch being adapted to cooperate with said cam so as to be brought out of the path of said stud after the operation of said time-delay mechanism.

5. In a shutter for photographic apparatus, in combination a casing provided with a central opening, a number of sectors pivotally mounted at the periphery of said casing and adapted to cover and uncover said opening, a first ring rotatably mounted on said casing and pivotally connected with said sectors, a second ring rotatably mounted on said casing, an operating lever, a releasing device mounted between said lever and said second ring and adapted to hold said lever and said second ring in engagement during a portion of the stroke of said lever in one direction and to release said ring during the other portion of said stroke in said direction and during the return stroke of said lever in the opposite direction, spring means adapted to urge said second ring in the opposite direction to that imparted to said second ring by said operating lever, connecting means between said first and second rings adapted to become operative only during a portion of the movement of said second ring under the action of said spring means, a stud carried on said second ring, an adjustable pivoting catch adapted to adjustably project in the path of said stud and yieldingly mounted in said casing so as to yield when said stud is displaced with said second ring under the action of said operating lever and to be pivoted by said stud when said second ring is rotated under the action of said spring means, a toothed member operatively connected with said catch, and a time-delay mechanism adapted to cooperate with said toothed member, so as to slacken the movement of said second ring and to delay the closing of the shutter.

ARSÈNE GITZHOVEN.